(12) United States Patent
Parry et al.

(10) Patent No.: US 6,175,552 B1
(45) Date of Patent: Jan. 16, 2001

(54) DISASTER RECOVERY IN A TELECOMMUNICATIONS NETWORK

(75) Inventors: Mark James Parry, Ware; Brian Michael Unitt, Bishop's Stortford, both of (GB)

(73) Assignee: Nortel Networks Limited, Montreal (CA)

(*) Notice: Under 35 U.S.C. 154(b), the term of this patent shall be extended for 0 days.

(21) Appl. No.: 08/900,459

(22) Filed: Jul. 25, 1997

(51) Int. Cl.$^7$ ........................................ H04J 3/00
(52) U.S. Cl. ................................ 370/216; 370/222
(58) Field of Search ........................ 370/216, 217, 370/221, 222, 223, 224, 220, 244, 245, 360, 373, 377, 384, 386, 387, 388, 369, 225, 227, 228, 229, 248, 251, 252, 253, 351, 352, 535, 537, 405, 406, 460, 462, 461, 522

(56) References Cited

U.S. PATENT DOCUMENTS

| | | | |
|---|---|---|---|
| 4,999,832 | * 3/1991 | Chen et al. | 370/369 |
| 5,461,608 | * 10/1995 | Yoshiyama | 370/222 |
| 5,570,344 | * 10/1996 | Fujii | 370/217 |
| 5,848,053 | * 12/1998 | Ardon | 370/360 |

OTHER PUBLICATIONS

Wehr, M. "Protection Des Reseaux De Transmission Synchrone" Communication Et Transmission, vol. 15, No. 4, Jan. 1, 1993, pp. 5–12.

Whitt, S., et al., "The Role of Sonet–Based Networks in British Telecom" International Conference on Communications, Including Supercomm Technical Sessions, Atlanta, Apr. 15–19, 1990, vol. 3, Apr. 15, 1990, Institute of Electrical Engineers and Electronics Engineers, pp. 919–923.

* cited by examiner

Primary Examiner—Dang Ton
(74) Attorney, Agent, or Firm—Lee, Mann, Smith, McWilliams, Sweeney & Ohlson

(57) ABSTRACT

A synchronous telecommunications network comprises a number of rings each incorporating a plurality of multiplexers and each coupled to a switch via a respective master multiplexer. A disaster recovery interface point provides an interface to one or more remote switches. Each ring incorporates a dormant master multiplexer coupled to the disaster recovery point and which is activated in response to a failure of the switch as a replacement master multiplexer so as to re-route traffic on the synchronous ring to the remote switch. This maintains service in the event of a catastrophic failure of the switch.

5 Claims, 7 Drawing Sheets

DISASTER RECOVERY IN A TELECOMMUNICATIONS NETWORK

This invention relates to telecommunications networks, and in particular to an arrangement and method for providing disaster recovery in such networks.

BACKGROUND OF THE INVENTION

With the deregulation of telecommunications services, many countries are now seeing a proliferation of new operators providing both voice and data networks and who are in competition with the original 'PTT' or monopoly operator. Typically, the original operator has an established mainly wired network while the new operators are introducing optical fibre networks based on synchronous (SDH or SONET) rings from the exchange or switch to a street cabinet serving subscribers. At the street cabinet, a synchronous multiplexer drops out 2 Mb/s channels which are further de-multiplexed to 64 kb/s voice and/or ISDN channels which are carried to the subscribers on twisted pair copper cables. Large, e.g. corporate users may be provided with their own optical circuit from the street cabinet.

The new operators have taken subscribers from the original operators by offering enhanced services and/or lower tariffs. This has encouraged the original operators to offer similar services and tariffs in an attempt to win back lost subscribers. The new operators are acutely aware of the potential loss of their newly acquired subscribers and are becoming increasingly concerned that any risk of loss of service should be minimised. It is believed that any such loss of service for a significant period of time will result in most of the subscribers reverting back to the original operator who will almost certainly have left in place their copper connections to the subscriber premises. This loss of service may for example result from a terrorist attack or from a fire damaging a switch beyond repair, or from major damage to the optical cables connected to a switch. Although there are various schemes for providing path protection in synchronous networks, these schemes do not address the problem of the catastrophic loss of a switch. There may also be a problem where engineers are excluded from a building containing equipment for a significant period of time, e.g. as the result of a fire or an explosion, and are thus unable to effect repairs. Thus, many of the new telecommunications operators are taking a keen interest in disaster recovery plans.

The current disaster recovery plan involves the provision of a replacement switch together with its associated transmission equipment and power generators, on vehicle trailers which can be towed to a disaster area and connected into the access network at a point remote from the damaged switch. A typical arrangement requires three large trailers together with a smaller back-up power trailer housing three 120 kVA generators. Such a set up is of course costly to maintain on a largely standby basis. Also, there may well be a significant delay before the equipment can be transported to the disaster area to initiate recovery of the network.

SUMMARY OF THE INVENTION

An object of the invention is to minimise or to overcome this disadvantage.

A further object of the invention is to provide an improved system and method for effecting disaster recovery in a synchronous network.

According to a first aspect of the invention there is provided an arrangement for providing disaster recovery in a synchronous telecommunications network comprising a number of rings each incorporating a plurality of multiplexers and each coupled to a switch, the arrangement including a disaster recovery interface point providing an interface to one or more remote switches, and means responsive to failure of said switch for re-routing traffic on said synchronous rings via said disaster recovery interface point to said one or more remote switches.

According to another aspect of the invention there is provided an arrangement for providing disaster recovery in a synchronous telecommunications network comprising a number of rings each incorporating a plurality of multiplexers and each coupled to a switch via a respective master multiplexer, the arrangement including a disaster recovery interface point providing an interface to one or more remote switches, dormant master multiplexers one for each said ring and each being coupled to the disaster recovery point, means responsive to failure of said switch for activating said dormant master multiplexers as replacement master multiplexers so as to re-route traffic on said synchronous rings via said one or more remote switches.

According to another aspect of the invention there is provided a method for providing disaster recovery in a synchronous telecommunications network comprising a number of rings each incorporating a plurality of multiplexers and each coupled to a switch via a respective master multiplexer, and including a disaster recovery interface point providing an interface to one or more remote switches, the method including responding to failure of said switch by re-routing traffic from said synchronous rings to said one or more remote switches via said disaster recovery interface point.

According to a further aspect of the invention there is provided a dormant master multiplexer for a synchronous telecommunications network, the multiplexer including first and second input/output ports for receiving and transmitting synchronous traffic, an auxiliary input/output port, means for establishing communication with a master multiplexer, and means for switching traffic from a said input/output port to the auxiliary input/output port in the event of an interruption of said communication.

In a preferred arrangement, communication between the master multiplexer and the dormant master multiplexer is established over a supervisory channel. If this communication is interrupted in both directions around a ring, indicating loss of the master multiplexer, the dormant master multiplexer activates automatically to take over the ring control functions.

In this arrangement, only one fibre pair per synchronous ring is required to effect coupling to the disaster recovery interface point. Loss of interconnect fibres does not affect the main ring, and the network immediately reconfigures itself on the loss of the master multiplexer. Concentration on to STM16 can be effected at the disaster recovery interface point for instant routing to a remote alternative exchange. The entire route can be managed and monitored at all times.

In a preferred embodiment, a diverter controlled by the network manager diverts incoming calls to another switch so that there is no necessity for other system operators to amend their routing tables.

BRIEF DESCRIPTION OF THE DRAWINGS

Embodiments of the invention will now be described with reference to the accompanying drawings in which.

DESCRIPTION OF PREFERRED EMBODIMENT

Figure 1:
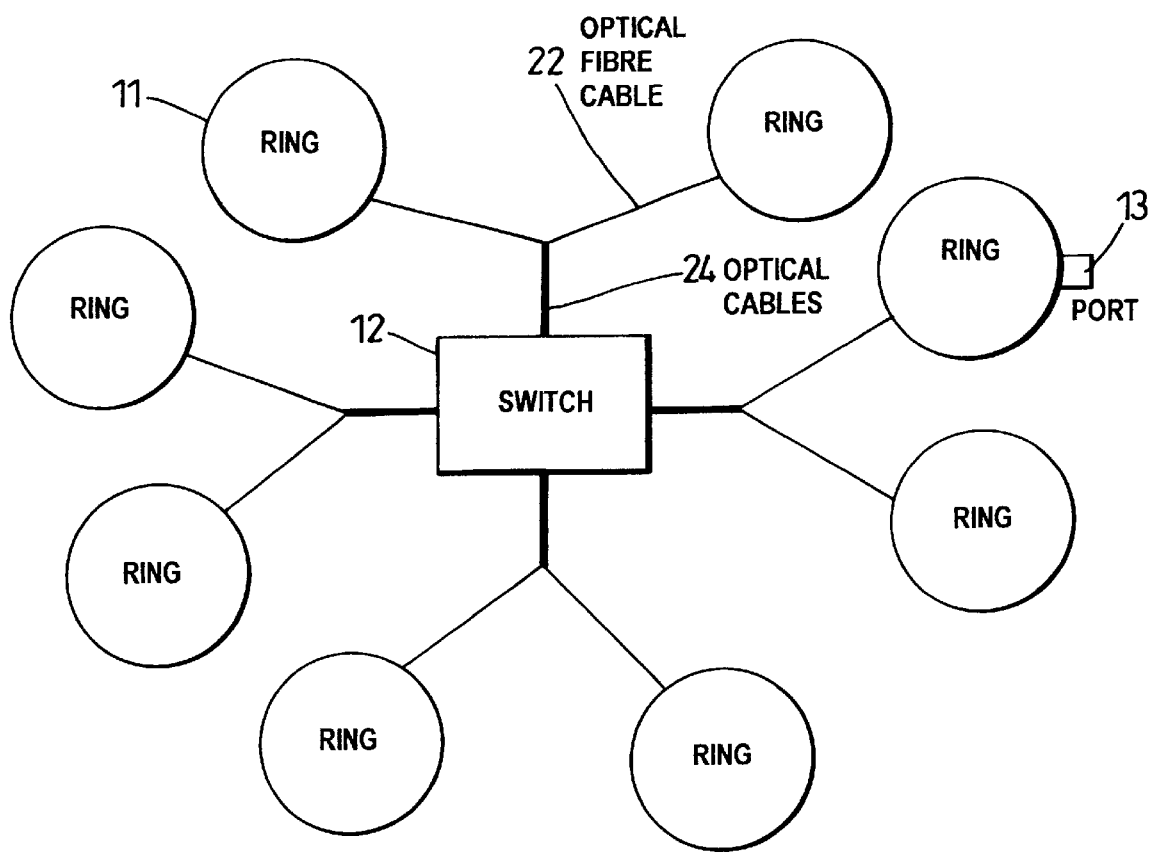
FIG. 1 is a highly schematic diagram of a synchronous network comprising a number of synchronous rings.

Referring to FIG. 1, which depicts a portion of an idealised SDH or SONET network layout, the arrangement comprises a number of rings 11 running e.g. at STM1 (synchronous transport module) and interconnected via optical fibre cables 22, 24 and a switch 12. The rings 11 provide path protection, i.e. any port 13 coupled to a ring can be accessed in either direction around the ring. The switch 11 forms network node which is coupled to further network switches (not shown) to transport traffic between nodes.

Figure 2:
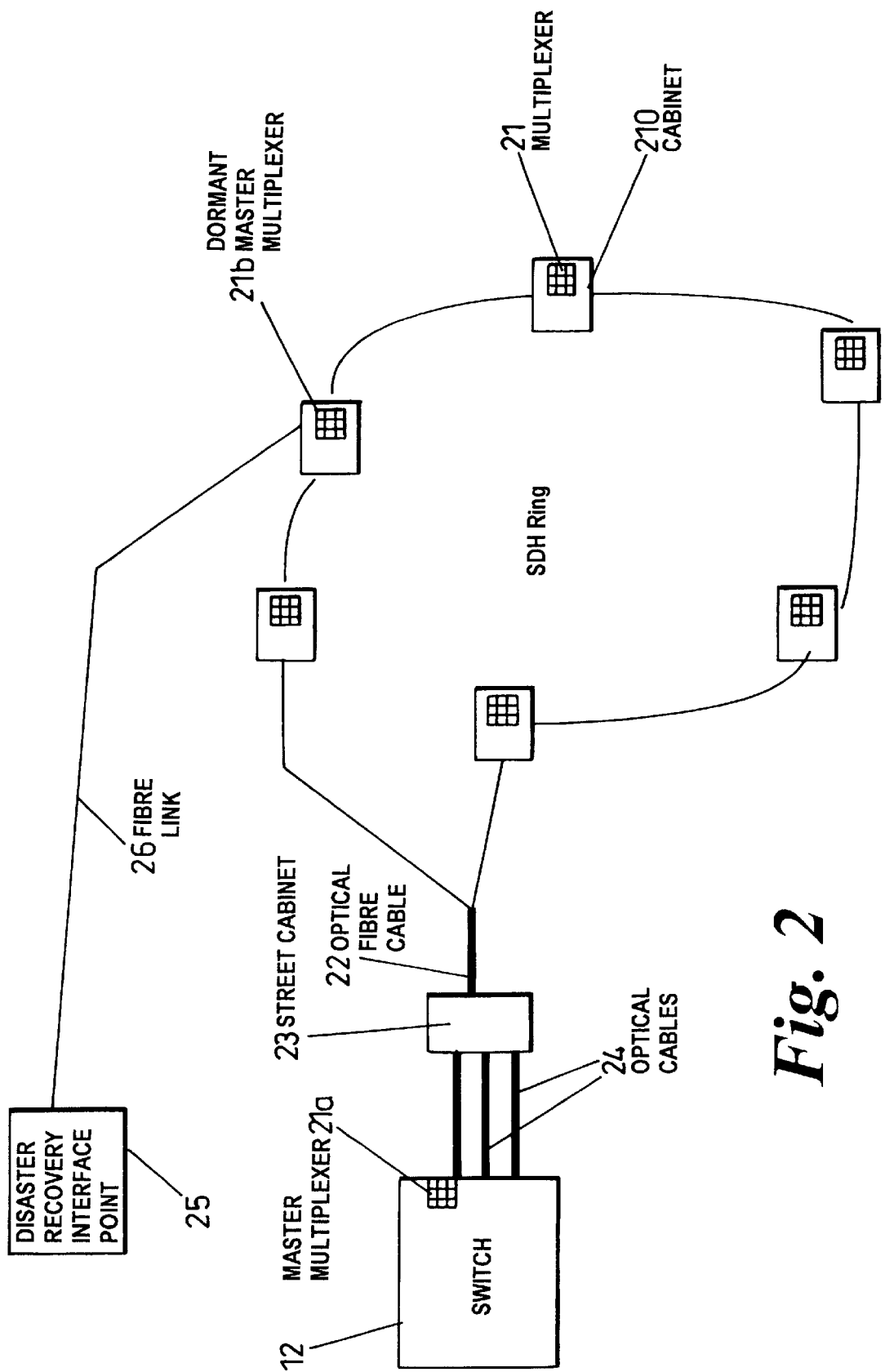
FIG. 2 is a schematic diagram of part of the synchronous network of FIG. 1 provided with a disaster recovery arrangement according to one embodiment of the invention.

FIG. 2 shows the construction of a ring of the network arrangement of FIG. 1. The ring incorporates a number of multiplexers 21 serving respective ports 13 and is coupled to a set of optical fibre cables 22 which terminate in a street cabinet 23 serving a number of similar rings and from which a further set of optical cables 24 provide coupling to the switch 12 The street cabinet 23 provides a distribution point. Typically, traffic will be carried between the ring multiplexers on a set of eight optical fibres.

Typically, each multiplexer 21 is enclosed in a respective cabinet 210. In normal operation, the ring operates under the control of a master multiplexer 21a disposed at the switch 12. The master multiplexer 21a provides control functions including the ring timing to which the other ring multiplexers 21 are synchronised. This synchronisation is effected from timing reference signals transmitted on a supervisory channel by the master multiplexer and to which each ring multiplexer adjusts its timing. The supervisory channel will also carry other information relating to the operation of the network. One of the ring multiplexers (21b) is configured as a dormant master multiplexer and is coupled to a disaster recovery interface point 25 via a dedicated fibre link 26. In the event of a disaster involving loss of the switch 12 and the master multiplexer 21a, the dormant master multiplexer is activated so as to become a replacement master multiplexer and to re-route all the ring traffic to the disaster recovery interface point via the fibre link 26. This reconfiguration of the network is automatic and does not require the intervention of a technician. Upon activation, the dormant master multiplexer 21b performs all the functions, including providing the ring timing reference, previously performed by the master multiplexer 21a which it has replaced. A function of the disaster recovery point is to patch the ring traffic to one or more other network switches 12a (shown in FIG. 6) remote from the disaster area so that the network service can be rapidly reinstated following the catastrophic loss of a switch. This redistribution of traffic can then be maintained until the switch has been repaired or replaced.

Figure 3:
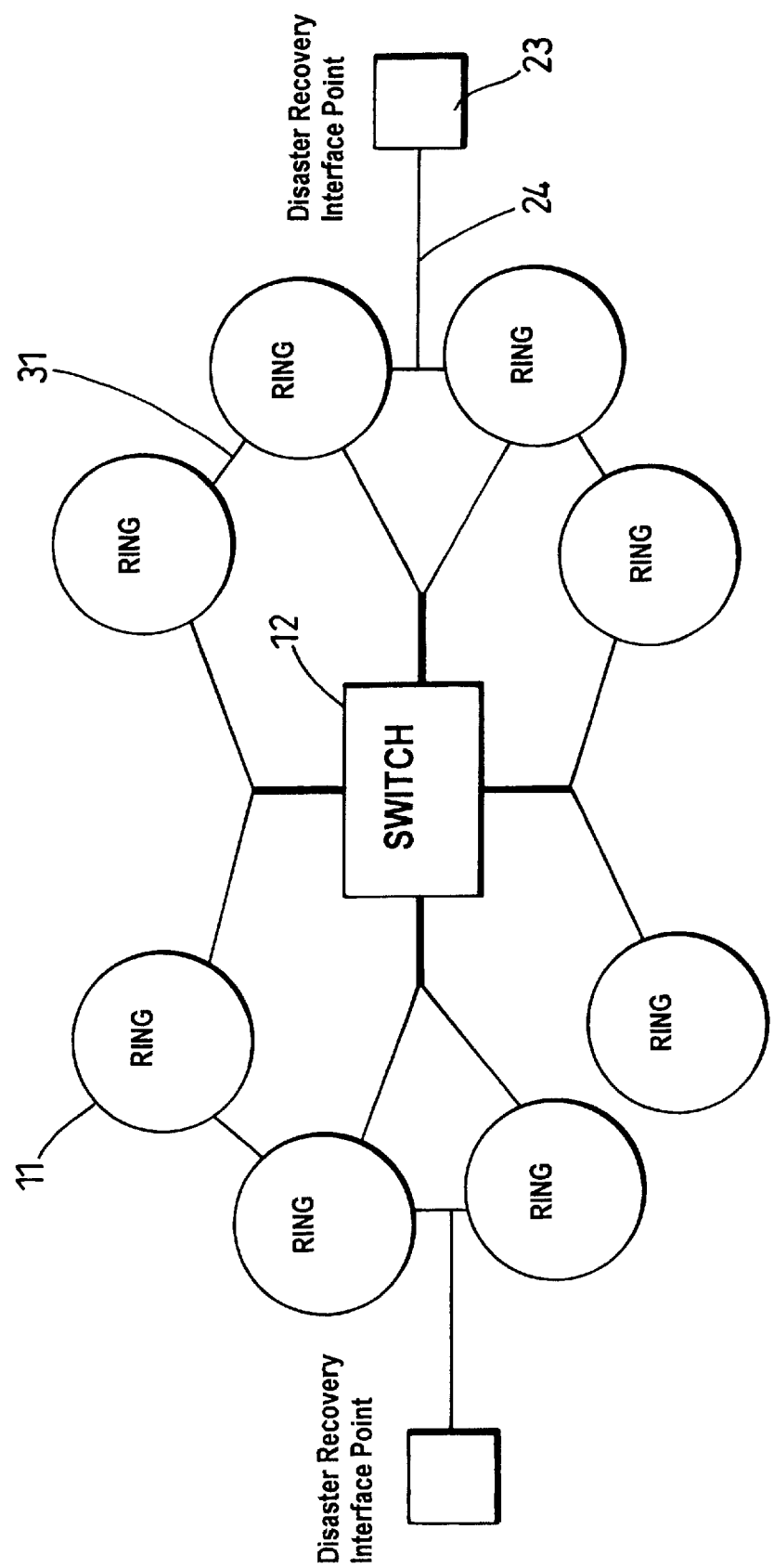
FIG. 3 shows the network construction of FIG. 2 in further detail and illustrates the way in which synchronous network rings are interconnected to a disaster recovery interface point.

The disaster recovery interface point is located preferably in a deep manhole or in a secure building at a point remote from the switch. The number of disaster recovery points required will depend on the network topology and on the size and number of rings served by the switch. For most applications, one disaster recovery point per switch will suffice, but it may be convenient to provide two or more where this is required by the network topology. Thus, in the arrangement shown in FIG. 3, two disaster recovery interface points are provided per switch, and all rings coupled to that switch are patched via respective fibre links to one or other of the two interface points. Conveniently, as shown in FIG. 3 the rings 11 may be interconnected by bridging adjacent rings with additional fibres 31 at their closest points to facilitate connection from any ring to the disaster recovery interface point.

The SDH and SONET synchronous transmission standard recommendations include a routing detection mechanism. The disaster recovery arrangement described herein accesses this mechanism to determine the integrity of the system and to respond to a system failure. In each synchronous ring, the dormant master multiplexer monitors the ring traffic. If this traffic is interrupted, the dormant master multiplexer responds by attempting to communicate with the master multiplexer in both directions around the ring via the supervisory channel. If the fault has arisen from a fibre breakage, then communication can still be maintained in one ring direction. If however, no contact can be made in either direction, this is indicative of a major failure and the disaster recovery mechanism is implemented.

Figure 4:
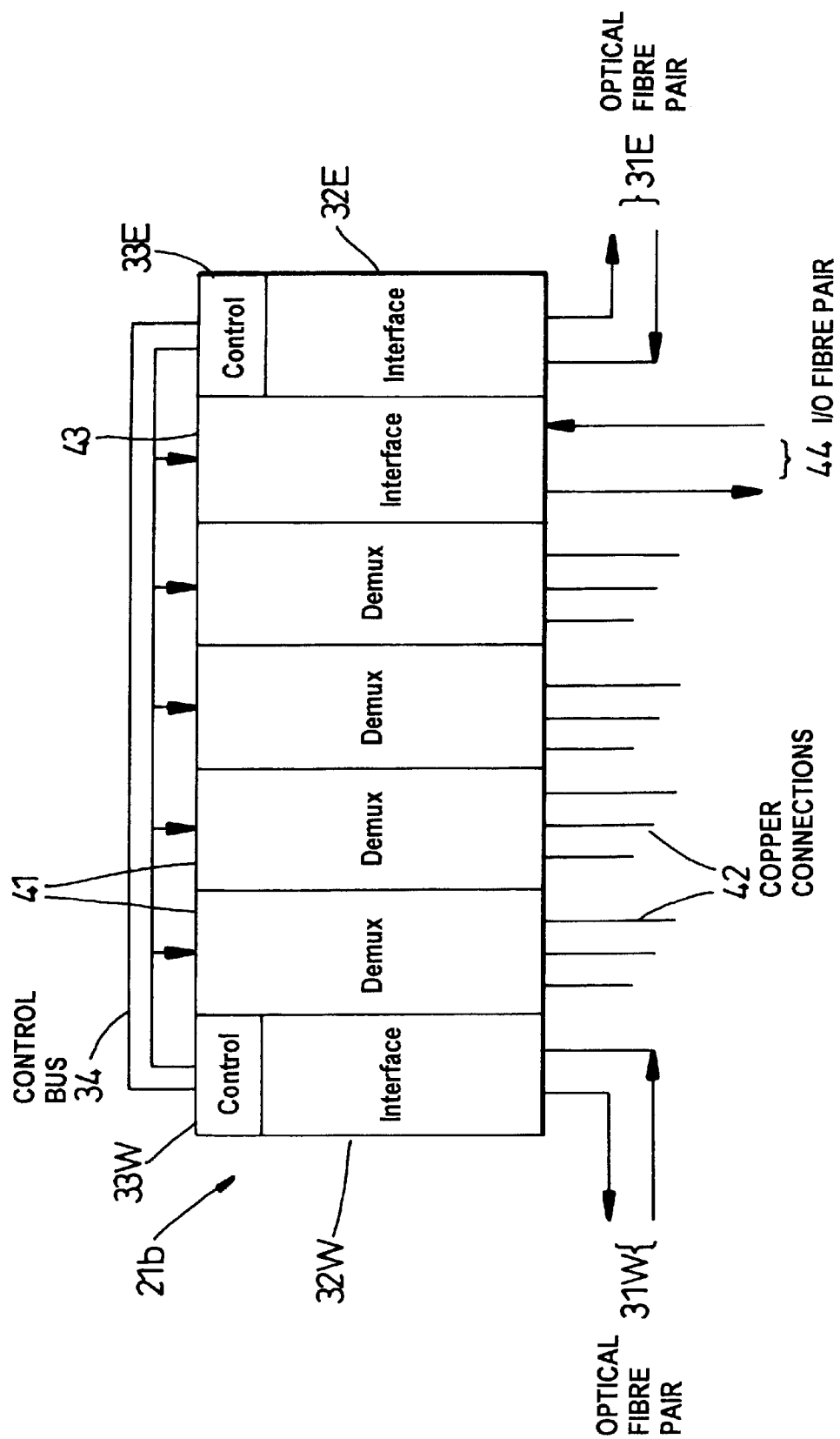
FIG. 4 illustrates the construction of a dormant master multiplexer employed in the network of FIG. 2.

FIG. 4 shows in schematic form the construction of a dormant master multiplexer employed in the network of FIG. 2. The multiplexer 21b is coupled in the ring to the "east" and "west" optical fibre pairs 31E, 31W via respective optical interface cards 32E and 32W. The interface cards 32E and 32W also incorporate supervisory/control units 33E, 33W which inter alia provide the communication in the east and west directions with the master multiplexer over the supervisory channel. Operation of the multiplexer is supervised from the control units via a control bus 34. Demultiplexer cards 41 provide 64 kbit/s interfaces to local customers via copper connections 42. A further optical interface card 43 is coupled to an input and output fibre pair 44 providing coupling to the disaster recovery point. In the event of an interruption of the ring traffic, the dormant master multiplexer is activated and attempts communication with the master multiplexer on the supervisory channel via the control units 33E and 33W. If communication with the master multiplexer cannot be established in either direction around the ring, i.e. a major fault or disaster has occurred, the dormant multiplexer assumes the functions of the master multiplexer and the optical interface card 43 is activated via the control units so as to re-route traffic via the fibre pair 44 to the disaster recovery point. If the master multiplexer subsequently returns to service and communication with the dormant master multiplexer is reestablished on the supervisory channel, the latter multiplexer reverts to its standby condition and the traffic re-routing is discontinued.

Figure 5:
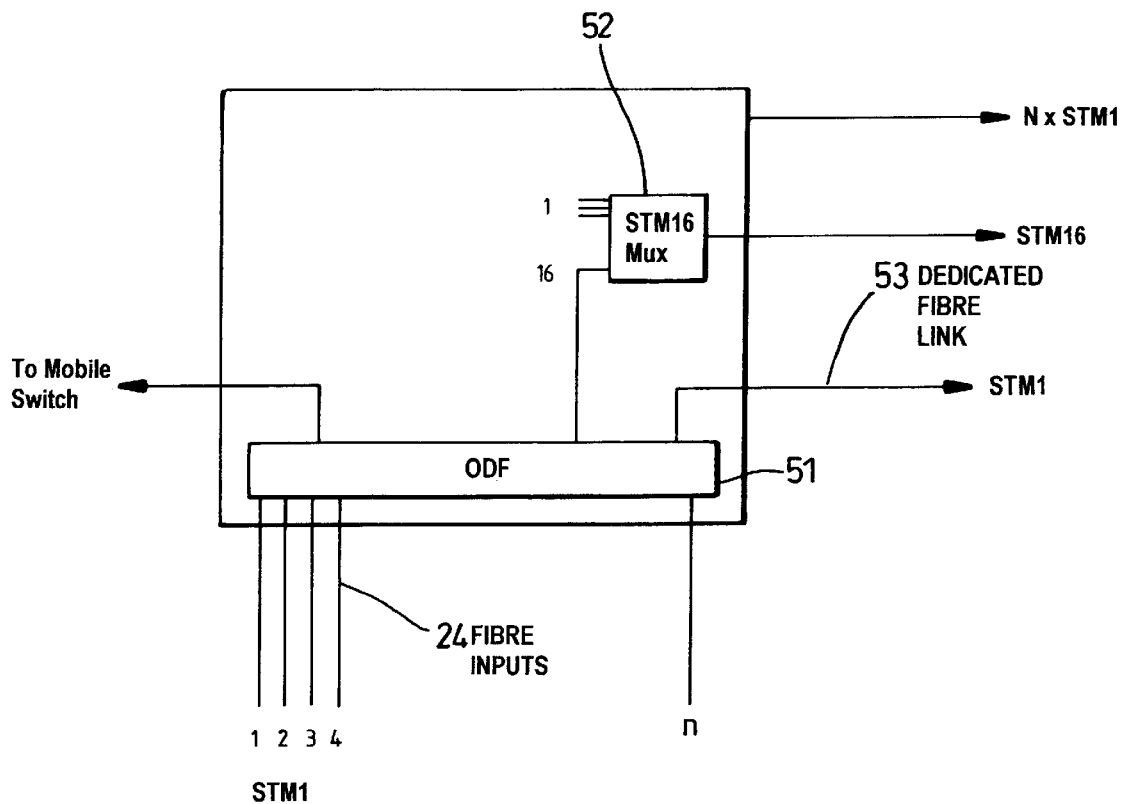
FIG. 5 illustrates the configuration of a disaster recovery interface point used in the network construction of FIGS. 2 and 3.

FIG. 5 shows the general construction of the disaster recovery interface point. At the interface point, the fibre inputs 24 from the synchronous rings serviced by the disaster recovery interface point terminate on an optical distribution frame 51 and from there can either be patched into an STM16 multiplexer 52 for transport elsewhere e.g to an alternative switch within the franchise area, or re-routed via a dedicated fibre link 53 to another switch 12a within the franchise area. An NxSTM1 output can also be provided to an alternative switch. A further output may be provided to a mobile switch. Connection to an STM16 multiplexer is preferred as the multiplexer can be integrated into a network management system and thus provide the best recovery. The disaster recovery interface point receives traffic from the rings associated with the switch served by the interface point and redistributes that traffic to one or more alternative switches so as to maintain service.

Figure 6:
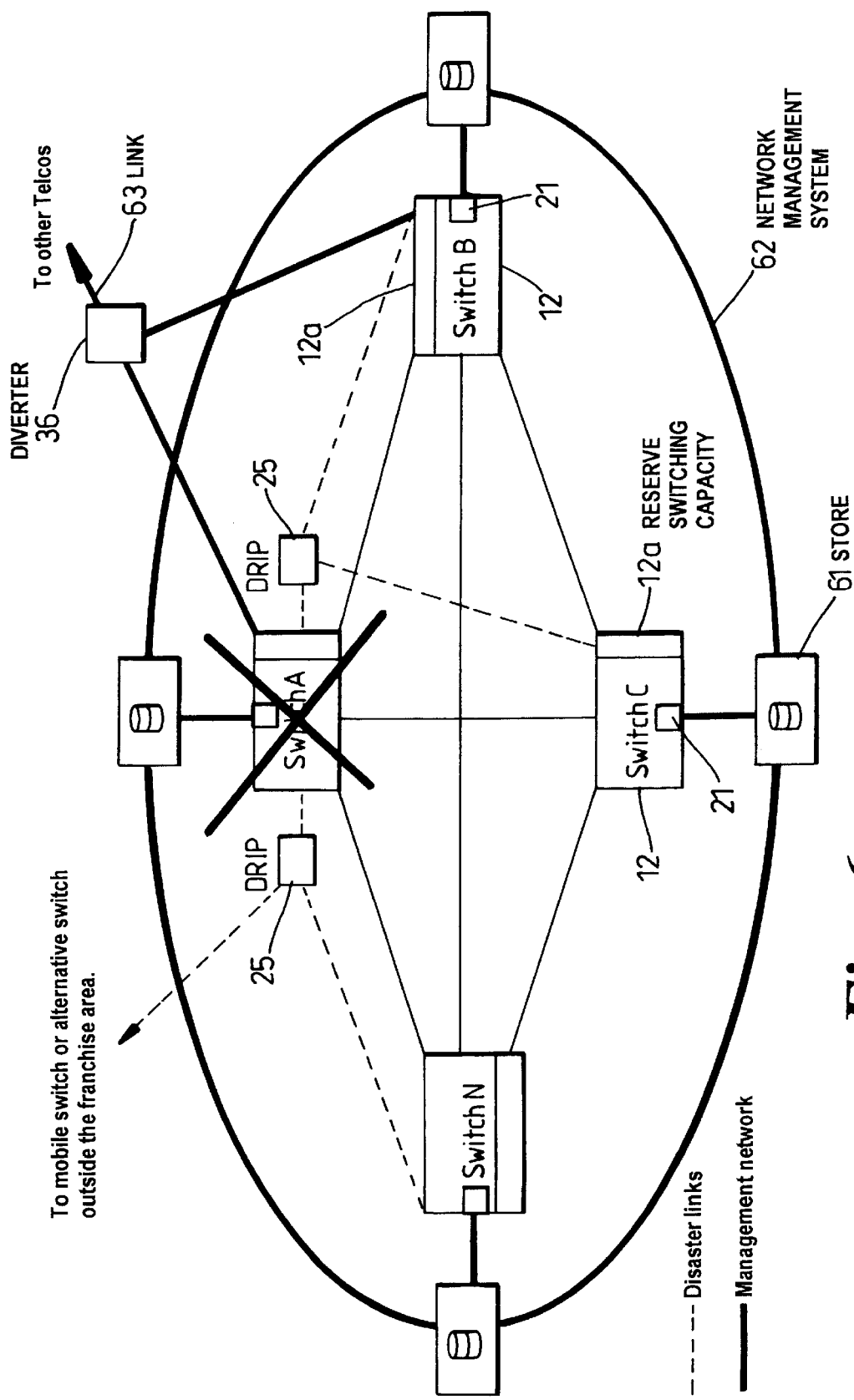
FIG. 6 illustrates the disaster recovery process for a switch in the network of FIGS. 1 and 2.

FIG. 6 shows schematically how a network management system can be installed to control the disaster recovery procedure. The management system connects all of the master multiplexers 21 in the system and ensures that all of the links are operative all of the time. Each switch 12 is designed to have an excess or reserve switching capacity (12a) such that, in the event of a disaster affecting one of the network switches (one switch, switch A, is shown as having failed), the capacity of each of the other switches can be reconfigured to match the redirected traffic or data from the damaged switch. To do this, each network switch 12 downloads to a respective store 61 the configuration of the datafill being transported to the excess capacity each time it is amended. When a disaster occurs and the secondary master multiplexer comes on line, the network management system, indicated schematically as 62, instructs the remote switches 12 to reconfigure appropriately. The network management system may also connect with other telecommunications networks via a link 63 so as to download the new location codes for those numbers that have been redirected. The network then self-heals in the time it takes for the software to be loaded at the switch. No intervention by technicians is required. An alternative approach is the installation of a diverter 36 controlled via the network management system. In the disaster recovery mode, the network management system diverts all incoming calls to new switches so that there is no need to amend the routing tables employed by other operators.

Figure 7:
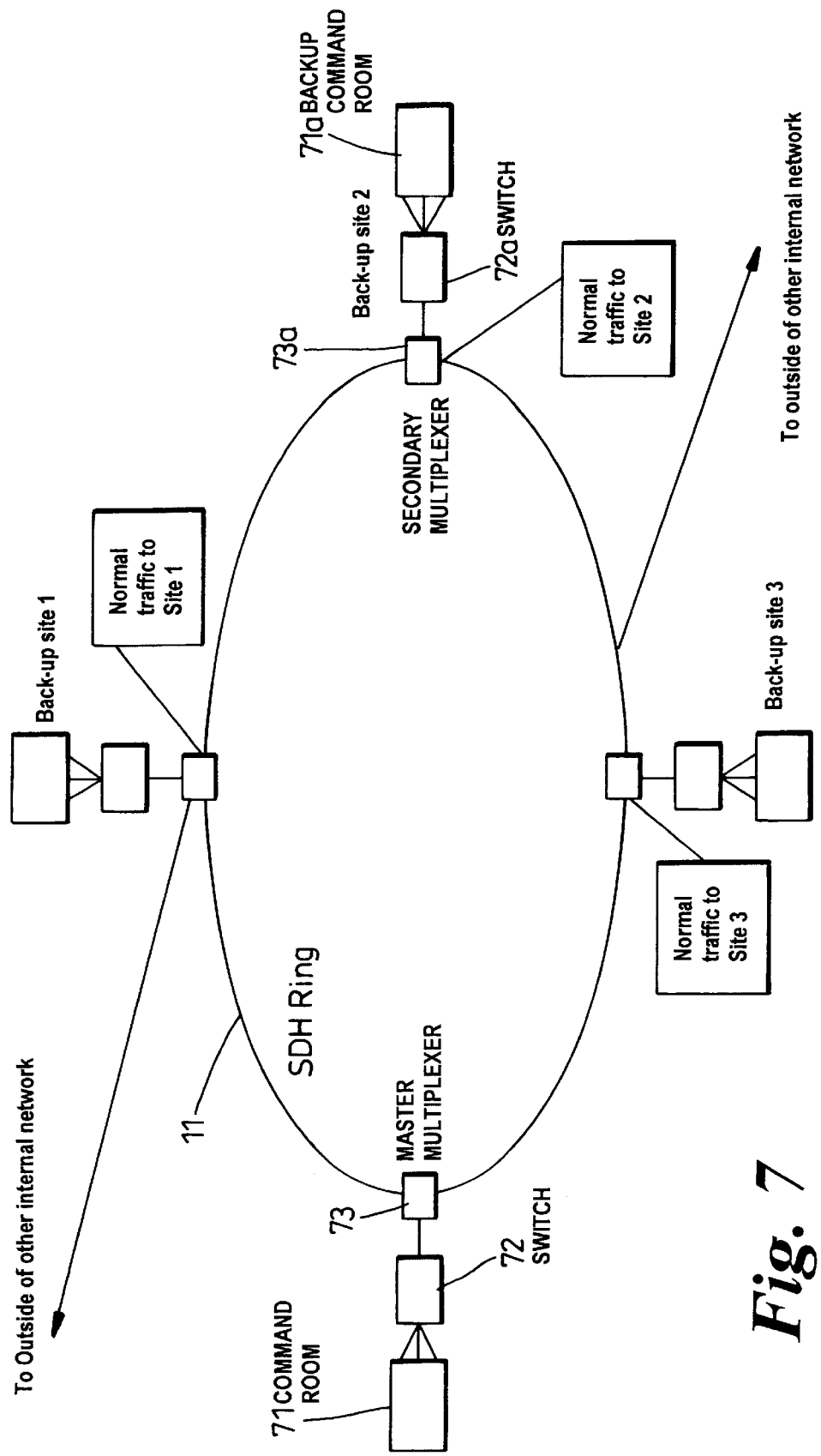
FIG. 7 illustrates an alternative network construction.

FIG. 7 illustrates the application of the technique to a secure network. In this arrangement a command room 71 at a master site is duplicated by back-up command rooms 71a at a number of secondary sites. Switches 72, 72a are disposed one at each site and provide access to respective sets of telephone and/or data terminals (not shown). The command room site is coupled to the ring via a master multiplexer 73 and each secondary site is coupled to the ring via a respective secondary multiplexer 73a. Each secondary site thus comprises an exact replica of the command room. This allows the command room function to be transferred from one site to another under the control of the network management system by reassigning the master multiplexer functionality to any one of the multiplexers on the ring. The switch 72a at the elected secondary site then behaves as if it were the switch at the original command room. The change is transparent to external networks.

The technique can be applied to all the lines within a network, or selectively to those lines, e.g. high revenue business lines, for which a premium has been paid for a guaranteed quality of service. It will also be understood that various modifications and alterations might be made by those skilled in the art without departing from the spirit and scope of the invention.

We claim:

1. An arrangement for providing disaster recovery in a synchronous telecommunications network comprising a number of rings each arranged to carry routed traffic and each incorporating a plurality of multiplexers and each coupled to a switch via a respective master multiplexer, the arrangement including a disaster recovery interface point providing an interface to one or more remote switches, dormant master multiplexers one for each of said rings and each of said dormant master multiplexers being coupled to the disaster recovery interface point, means responsive to failure of said switch for activating said dormant master multiplexers as replacement master multiplexers so as to re-route traffic on said rings via said one or more remote switches, wherein each of said dormant master multiplexers has means for communication with the respective master mulitplexer, and wherein each said dormant master multiplexer is arranged to operate as a replacement master multiplexer in the event that said communication is interrupted, wherein said communication is effected via a supervisory channel, and incorporating a plurality of other switches each having reserve capacity, there being means responsive to the failure of said switch for re-routing traffic from said switch to the reserve capacity of the other switches.

2. An arrangement as claimed in claim 1, wherein adjacent rings are provided with fibre inter-connections whereby to facilitate coupling of said rings to the disaster recovery interface point.

3. An arrangement as claimed in claim 1, wherein said disaster recovery interface point provides coupling of traffic to the remote switch via a multiplexer.

4. An arrangement as claimed in claim 3, wherein said multiplexer is a STM16 multiplexer.

5. A method for providing disaster recovery in a synchronous telecommunications network arranged to carry routed traffic and comprising a number of rings each incorporating a plurality of multiplexers and each coupled to a switch via a respective one of a plurality of master mulitplexers, and including a disaster recovery interface point providing an interface to one or more remote switches, the method including responding to failure of said switch by re-routing traffic from said rings to said one or more remote switches via said disaster recovery interface point, and including replacing a respective one of said plurality of master multiplexers with one of said plurality of multiplexers as a new master multiplexer in response to a failure of said switch, and wherein there are a plurality of remote switches each having reserve switching capacity, and wherein the re-routed traffic is distributed among said reserve switching capacity.

* * * * *